United States Patent [19]
Olarig et al.

[11] Patent Number: 6,009,524
[45] Date of Patent: Dec. 28, 1999

[54] METHOD FOR THE SECURE REMOTE FLASHING OF A BIOS MEMORY

[75] Inventors: Sompong P. Olarig, Cypress; Michael F. Angelo, Houston, both of Tex.

[73] Assignee: Compact Computer Corp, Houston, Tex.

[21] Appl. No.: 08/920,810

[22] Filed: Aug. 29, 1997

[51] Int. Cl.[6] .................................................. G06F 9/24
[52] U.S. Cl. .................... 713/200; 713/201; 709/225; 380/25
[58] Field of Search .................... 709/225; 713/201, 713/200; 380/4, 25

[56] References Cited

U.S. PATENT DOCUMENTS

| | | | |
|---|---|---|---|
| 5,388,267 | 2/1995 | Chan et al. | |
| 5,421,006 | 5/1995 | Jablon et al. | |
| 5,455,865 | 10/1995 | Perlman | 380/49 |
| 5,666,416 | 9/1997 | Micali | 380/23 |
| 5,692,047 | 11/1997 | McManis | 380/4 |
| 5,757,914 | 5/1998 | McManis | 380/4 |
| 5,778,070 | 6/1996 | Mattison | 380/25 |
| 5,844,986 | 9/1996 | Davis | 380/4 |
| 5,859,911 | 6/1997 | Angelo et al. | 380/25 |

OTHER PUBLICATIONS

U.S.Patent Application "System and Method for Secure Information Transmission Over A Network", SN 08/764,177 filed Dec. 13, 1996, P–1257.

*Primary Examiner*—Ly V. Hua
*Assistant Examiner*—Wasseem Hamdan
*Attorney, Agent, or Firm*—Robert Groover

[57] ABSTRACT

An improved system and method for FLASH BIOS upgrades which is particularly useful in network hubs. Each hub or node which is equipped with a FLASH memory is also equipped with a validation system, which ensures that a received FLASH upgrade is authorized and uncorrupted. Each set of instructions to be flashed is marked both with a vendor authorization digital signature and also a system administrator authorization digital signature, and BOTH digital signatures must be recognized by the validation system before the FLASH memory will be upgraded. Because digital signatures are used for security purposes, flash upgrades can be performed from any location on the network, and are not limited to an administrative node.

17 Claims, 2 Drawing Sheets

METHOD FOR THE SECURE REMOTE FLASHING OF A BIOS MEMORY

BACKGROUND AND SUMMARY OF THE INVENTION

This application relates to computer network systems, and more particularly to network flash BIOS memories.

Background: BIOS Updates

A Basic Input/Output System (BIOS) memory is a memory (typically small) which stores the basic software to provide for initial system setup and configuration, and allows the system to load and execute subsequent programs. This configuration software must be available to the system when it is first started, so the BIOS memory must be non-volatile.

In some systems it is sufficient to supply a read-only memory which is hard coded with the BIOS system. With today's rapidly changing technologies, however, it has become advantageous to provide rewritable BIOS memories, so that the BIOS software can be upgraded when necessary. Therefore, many of today's systems use flash or EEPROM memories to store the BIOS software, and provide means for the user of the system to reprogram the BIOS memory when necessary. With a flash BIOS, the BIOS image or a portion of the BIOS image can be updated by a software update. This is often performed by downloading or storing the new software, or "flash" information, onto a media storage device, such as a floppy disk, and executing a program to write the new software into the BIOS memory. This procedure is commonly referred to as "flashing" the memory.

A flash BIOS typically consists of two separately programmable portions, each of which, during normal operation, contains an identical copy of the BIOS software. An "active flag" indicates which memory portion is actually executed when the system is started.

To upgrade a BIOS in flash memory, only half the memory is updated at one time. In order to update the BIOS without ever losing operability, the inactive half of the BIOS, according to the active flag, is overwritten, and then the flag state is changed to make the inactive half active, and then the system is power cycled.

This causes the system to come up in the active side of the BIOS.

Background: Networked Systems

In many common applications, the BIOS must be flashed locally, requiring the operator's actual presence at the machine to be updated. In other systems, the BIOS may be updated remotely, by sending the BIOS upgrade over a telephone connection or local network. Remote flashing makes system upgrades much more convenient, but introduces possible security problems, in that the BIOS may possibly be replaced or corrupted by a remote user or even a "virus" running on a remote system.

In a typical computer network, multiple computer systems are each connected to a node of a common network hub. Typically, one of these nodes is designated as an "admin" node, i.e., a node from which a system administrator can perform remote updating of the BIOS software of the network hub.

On a current networked computer system, each node of a computer network is a computer which may have an individual flash memory, and the network hub also has its own flash memory. In current systems, there is no procedure or system by which to perform upgrades to the BIOS software in a way that can conveniently be handled by system administrators, and which also assures security and compatibility.

Background: Public Key Cryptosystems

In public key cryptosystems, each user has two related complementary keys, a publicly revealed key and a private key. Each key unlocks the code that the other key makes. Knowing the public key does not help you deduce the corresponding private key. The public key can be published and widely disseminated across a communications network. In the context of this application, a public key may be stored in an otherwise vulnerable memory, but that public key is only useful to decrypt data which was encrypted with the corresponding private key.

Background: Digital Signatures

Digital signatures are used to provide message authentication. The sender, for example a software vendor or system administrator, uses his own private key to encrypt a "message digest," thereby 'signing' the message. A message digest is a cryptographically-strong one-way hash function. It is somewhat analogous to a "checksurn" or Cylic Redundancy Check (CRC) error checking code, in that it compactly represents the message and is used to detect changes in the message. Unlike a CRC, however, it is computationally infeasible for an attacker to devise a substitute message that would produce an identical message digest. The message digest gets encrypted by the sender's private key, creating a digital signature of the message. Various digital signature standards have been proposed, such as Secure Hash Algorithm (SHA) or Message Digest 5 (MD5)

The recipient can verify the digital signature by using the sender's public key to decrypt it. This proves that the sender was the true originator of the message, and that the message has not been subsequently altered by anyone else, because the sender alone possesses the private key that made that digital signature. Forgery of a signed message is infeasible, and the sender cannot later disavow his digital signature.

These two processes (encryption and digital signatures) can be combined to provide both privacy and authentication by first signing a message with the sender's private key, then encrypting the signed message with the recipient's public key. The recipient reverses these steps by first decrypting the message with his own private key, then checking the enclosed digital signature with the sender's public key. In this way, the encrypted message cannot be read by anyone but the recipient, and it can only have been created by the sender.

Further background on digital signatures can be found, for example, in the following books, all of which are hereby incorporated by reference: Pfitzman, Digital Signature Schemes (1996); Grant, Understanding Digital Signature (1997).

Improved System and Method for FLASH BIOS Upgrades

The present application discloses an improved system and method for FLASH BIOS upgrades which is particularly useful in network hubs. Each hub or node which is equipped with a FLASH memory is also equipped with a validation system, which ensures that a received FLASH upgrade is authorized and uncorrupted. Each set of instructions to be flashed is marked both with a vendor authorization digital signature and also a system administrator authorization digital signature, and both digital signatures must be recognized by the validation system before the FLASH memory will be upgraded. Because digital signatures are used for security purposes, flash upgrades can be performed from any location on the network, and are not limited to an admin node.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 4:
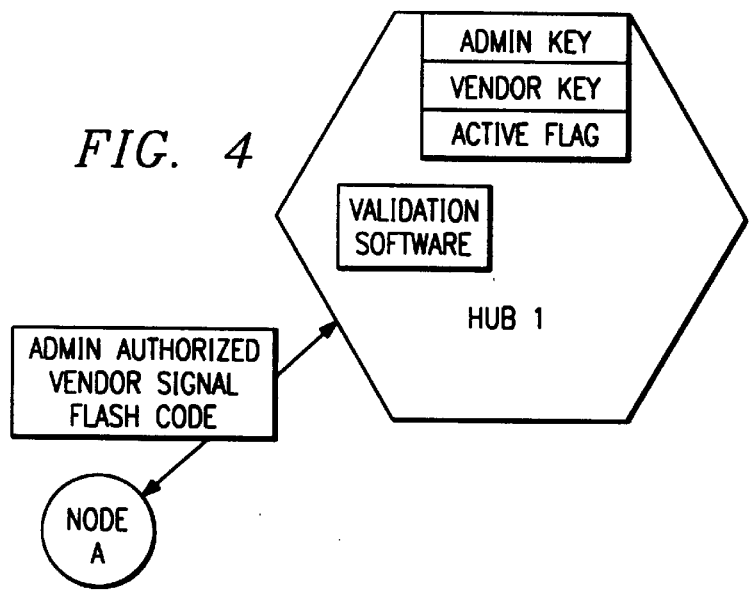
FIG. 4 shows a block diagram of a computer system connected to a network hub according to presently preferred embodiment.

FIG. 4 shows a block diagram of a computer system NODE A connected to a network hub HUB1 according to presently preferred embodiment. Node A may be a typical desktop computer or perhaps a network server computer. In this single-flash scenario, Node A obtains flash information from HUB1. The Admin in NODE A verifies the flash information and digitally signs. This provides validation for the flash as well as authorization. Next, the Admin transmits a double-signed code to HUB1. HUB1 validates that the code was authorized by Admin and is valid as from the vendor.

Figure 5:
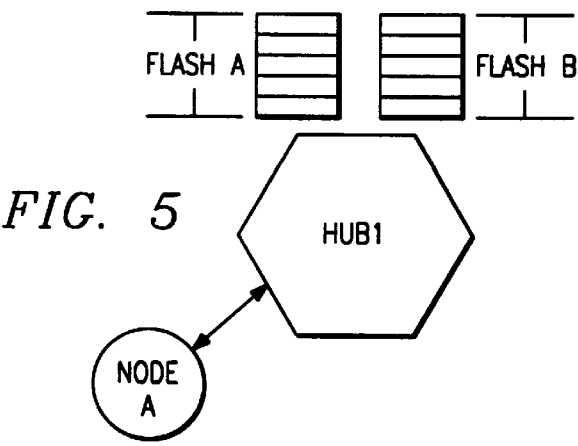
FIG. 5 shows a block diagram of a computer system (node) and hub where the dual-flash variant is employed.

FIG. 5 shows a block diagram of a computer system (node) and hub where the dual-flash embodiment is employed. HUB1 determines which portion of Flash memory, A or B, is not in use. This can be done by looking at a particular bit that indicates which Flash is running. Assuming Flash A is active, HUB1 then flashes Flash B. HUB1 revalidates Flash B and sets Flash B active. Finally, HUB1 generates a reset to boot to the new flash firmware update.

Error conditions returned to the user include the following: if the flash code is not authorized, the system ignores the flash; if the flash code doesn't have a valid vendor digital signature, again, the system ignores the flash; the flash code is determined to be invalid if the flash reboot process times out—HUB1 then sets Flash A as active, generates a reset, and reboots.

Figure 2:
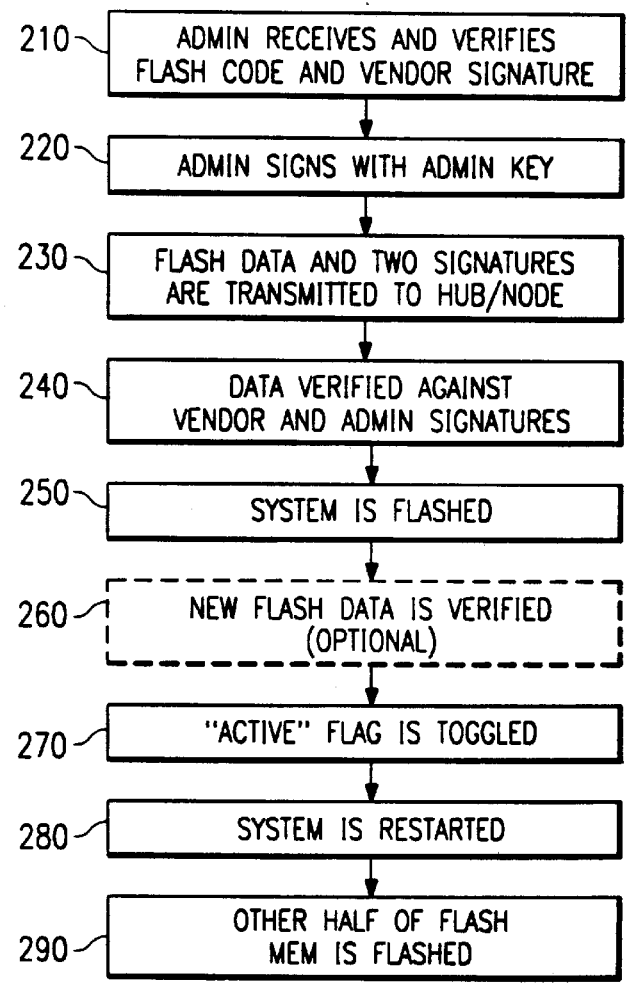
FIG. 2 shows a flowchart of the process of the presently preferred embodiment.

FIG. 2 shows a flowchart of the process of the presently preferred embodiment covering both the single and dual-flash scenarios. In a BIOS upgrade process according to preferred embodiment, the system administrator obtains the upgrade software and loads it into the admin node. The administrator will examine the software, using the vendor's public key, which is also stored in each flash memory, and verify that it contains an appropriate vendor digital signature (step 210). Having verified the upgrade, the administrator then attaches his own authorization digital signature (step 220), using his private key, to verify that the software is to be flashed to the target memory. The upgrade software, with both vendor and authorization digital signatures, is transmitted to the target system (step 230), which may be the network hub or another computer system on the network.

When the target system receives the transmission, it verifies each of the digital signatures (step 240), using the stored public keys, to ensure that the upgrade is valid and authorized. If it is, the target system then applies the upgrade to the inactive portion of the flash memory (step 250). The target system may then optionally perform a checksum operation on the inactive memory portion (step 260) to ensure that it has been properly programmed. The active flag is then toggled to set the newly programmed portion of the memory active (step 270).

The target system is restarted (step 280), and the BIOS software is loaded. Since the active flag has been reset, the upgraded software is executed. If it executes with no errors, the other flash memory portion, now inactive, is flashed with the upgrade software (step 290). If, however, the new software causes the system to crash, or causes some other error, the active flag is automatically toggled back to the memory portion with the known good software (step 270).

Each set of update software must have two digital signatures. One of these digital signatures identifies the software vendor, which will ensure that only an authentic BIOS upgrade is applied. The second digital signature is an authorization digital signature of the system administrator, which ensures that only authorized BIOS upgrades are applied. The digital signatures can be defined by any convenient digital signature standard (an RSA—Rivest, Shamir, & Adleman—standard is preferred).

The flash memory must therefore contain two public decryption keys according to a dual-key encryption system. One public key will correspond to a private key known only to the vendor, and the other public key will correspond to a private key known only to the system administrator. By using a dual-key digital signature standard, there is little chance of a security compromise if the flash is examined (by users or intruders) to determine the stored public keys. According to the disclosed process, these public keys will still not allow an unauthorized software upgrade to be applied.

The verification of the digital signatures on the target system may be accomplished in multiple ways. The preferred embodiment requires a double digital signature: flash updates must be signed both by the vendor and by the system administrator, and both digital signatures must be identified by the data in the flash memory. This identification is accomplished by a dual-key digital-signature-verification system. "Public" keys for both the vendor and the administrator are stored or hard-coded into the flash memory. The corresponding "private" keys are held by the vendor and system administrator, and only these private keys can generate the digital signatures which the hub can recognize using the public keys stored in the flash memory.

Therefore, even if the keys stored in the memory are compromised, the flash is still secure. With the private keys possessed only by the vendor and system administrator, it is practically impossible for unauthorized individuals to create an acceptable digital signature for the BIOS upgrade.

In another alternate embodiment, other stenographic implementations based upon cryptographic relations can be used.

In an alternative class of embodiments, an additional flag can be used to allow or restrict downgrading of the BIOS more than a certain number of revision levels. This avoids the common problem where users "upgrade" to obsolete software.

For system initialization, overwriting of the administrator's public key in the flash is preferably a protected operation, unless the address reserved for this is empty. If no administrator public key is known, then no verification of an administrator signature is possible. Thus this option helps to assure safe initialization of new systems.

Figure 3:
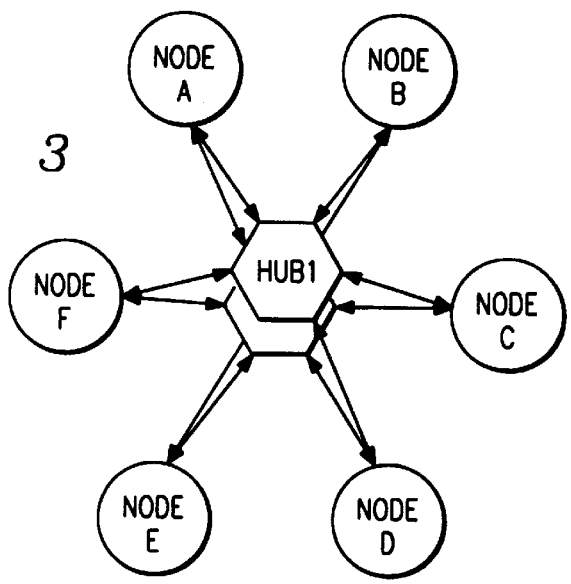
FIG. 3 shows a block diagram of a computer network system according to the presently preferred embodiment.

FIG. 3 shows a block diagram of a computer network system according to the presently preferred embodiment. In this scenario, a central six-port hub HUB1 connects a small network of six nodes, NODES A–F, each node comprising either a desktop computer or perhaps even a network server.

Figure 1:
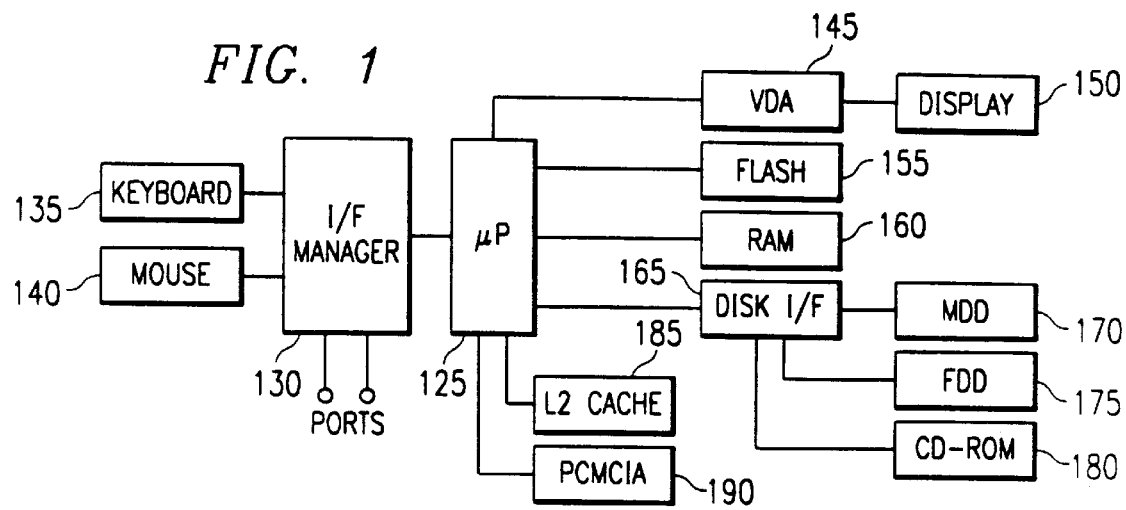
FIG. 1 shows a block diagram of a computer system with FLASH memory according to the presently preferred embodiment.

FIG. 1 shows a block diagram of a computer system with FLASH memory according to the presently preferred embodiment. The complete computer system includes, in this example:

- user input devices (e.g. keyboard 135 and mouse 140);
- at least one microprocessor 125 which is operatively connected to receive inputs from said input device, through an interface manager chip 130 (which also provides an interface to the various ports);
- a memory (e.g. flash memory 155 and RAM 160), which is accessible by the microprocessor;
- a data output device (e.g. display 150 and display driver card 145) which is connected to output data generated by microprocessor; and
- a magnetic disk drive 170 which is read-write accessible, through an interface unit 165, by the microprocessor.

Optionally, of course, many other components can be included, and this configuration is not definitive by any means.

The internal hardware architecture of a network hub or route is similar in many respects, but includes additional features (and may not contain all the peripherals). For example, a hub typically includes a service processor—e.g. a 6800—with its own serial link—which would handle requests for flash update.

According to a disclosed class of innovative embodiments there is provided: A computer system, comprising: memory, and a microprocessor operatively connected to read and write said memory; a flash memory; a flashing circuit for writing said flash memory; and a validation circuit connected to said flashing circuit to verify first and second digital signature codes; wherein said validation circuit enables said flashing circuit only when said first and second digital signature codes are validated.

According to another disclosed class of innovative embodiments, there is provided: A computer network system, comprising: a network hub; a plurality of computer systems, each system connected to said network hub and having a user input device, a microprocessor operatively connected to detect inputs from said input device, a memory which is connected to be read/write accessible by said microprocessor, a programmable non-volatile memory, said programmable non-volatile memory containing first and second validation keys, a power supply connected to provide power to said microprocessor, said memory, and said display; wherein said programmable non-volatile memory of any of said computer systems may only be programmed when first and second encrypted digital signatures respectively corresponding to first and second validations code are received by that system.

According to another disclosed class of innovative embodiments, there is provided: A computer network system, comprising: a network hub having a programmable non-volatile memory; a plurality of computer systems, each system connected to said network hub and having a user input device, a microprocessor operatively connected to detect inputs from said input device, a memory which is connected to be read/write accessible by said microprocessor, a video controller connected to said microprocessor, a display operatively connected to display data generated by said video controller at a first refresh rate, and a power supply connected to provide power to said microprocessor, said memory, and said display; wherein said programmable non-volatile memory of said network hub can only be programmed when codes corresponding to first and second digital signatures are received by said hub and verified against public keys stored by said hub.

According to another disclosed class of innovative embodiments, there is provided: A method, comprising the steps of: (a.) receiving, in a computer system, data corresponding to a system program, a vendor digital signature, and an authorization digital signature; (b.) decrypting said vendor digital signature and said authorization digital signature in said computer system to produce a vendor code and an authorization code; (c.) comparing said vendor code and said authorization code with first and second access codes stored in said system; (d.) if said vendor code and said authorization code correspond to said first and second access codes, then programming a memory of said system with said system program.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

The presently preferred embodiment uses an RSA algorithm for digital signature verification, but in alternative embodiments other digital signature verification algorithms can be used.

In an alternative embodiment the dual-digital signature-verification requirement is applied only to remote updating of flash memory, and can be bypassed by a user who is physically present at the computer. This provides additional protection against loss of the administrator public key (e.g. if an administrator quits).

It should also be noted that the disclosed innovative ideas are not limited only to Windows. DOS or UNIX systems, but can also be implemented in other operating systems.

It should also be noted that the disclosed innovative ideas are not limited only to systems based on an x86-compatible microprocessor, but can also be implemented in systems using 680x0, RISC, or other processor architectures.

It should also be noted that the disclosed innovative ideas are not by any means limited to systems using a single-processor CPU, but can also be implemented in computers using multiprocessor architectures.

It should also be noted that the disclosed innovative ideas are applicable not only to network hubs, but also to network routers which interconnect network hubs, and other similarly related network systems.

What is claimed is:

1. A computer system, comprising:

a writable nonvolatile memory;

at least one microprocessor operatively connected to execute at least one instruction sequence from said nonvolatile memory at reboot, and to control writing thereto;

validation data in said nonvolatile memory which can authenticate digital signatures from first and second originators;

wherein said microprocessor enables writing into said nonvolatile memory only after successful authentication, using said validation data, of first and second digital signature codes which are attached to the data to be written, by a digital signature verification process;

wherein said first digital signature code corresponds to a vendor signature;

wherein said second digital signature code corresponds to an administrator signature;

whereby the administrator can update a system program from any computer in the system by providing said second digital signature code.

2. The system of claim 1, wherein said first digital signature code is checked for validation of said data to be written, and said second digital signature code is checked for validation of said first digital signature in combination with said data to be written.

3. The system of claim 1, wherein said digital signature codes are checked using a public-key/private-key digital signature relationship, and said nonvolatile memory contains public keys corresponding to said first and second originators.

4. The system of claim 1, wherein said nonvolatile memory is a flash memory which comprises separately programmable first and second halves, and a toggle bit to select between said halves.

5. The system of claim 1, wherein said system is a network hub, and an initialization program stored in said nonvolatile memory is executed whenever said system undergoes a system reset.

6. The system of claim 1, wherein said system is a network route, and an initialization program stored in said nonvolatile memory is executed whenever said system undergoes a system reset.

7. A computer network system, comprising:

a network hub;

a plurality of computer systems, each system connected to said network hub and having
a user input device,
a microprocessor operatively connected to detect inputs from said input device,
a memory which is connected to be read/write accessible by said microprocessor,
a programmable non-volatile memory, said programmable non-volatile memory containing first and second validation keys as well as boot routines,
a power supply connected to provide power to said microprocessor, said memory, and said display;

wherein said programmable non-volatile memory of any of said computer systems can be remotely programmed, but only when two digital signatures on the data to be programmed are both validated by a digital signature verification process which uses said first and said second validation keys;

wherein said first digital signature corresponds to a vendor signature wherein said second digital signature corresponds to a system administrator signature;

whereby the administrator can update a system program from any computer in the system by providing said second digital signature.

8. The system of claim 7, wherein said programmable non-volatile memory is a flash memory.

9. The system of claim 7, wherein said programmable non-volatile memory is a flash memory comprising separately programmable first and second halves.

10. The system of claim 7, wherein said programmable non-volatile memory comprises separately programmable first and second halves.

11. The system of claim 7, wherein an initialization program stored in said programmable non-volatile memory is executed whenever said network hub is powered on.

12. The system of claim 7, wherein said programmable non-volatile memory of any of said computer systems can only be remotely programmed if said first digital signature validates said data to be written, and said second digital signature validates said first digital signature in combination with said data to be written.

13. A computer network system, comprising:

a network hub having a programmable non-volatile memory;

a plurality of computer systems, each system connected to said network hub and having
a user input device,
a microprocessor operatively connected to detect inputs from said input device,
a memory which is connected to be read/write accessible by said microprocessor,
a video controller connected to said microprocessor,
a display operatively connected to display data generated by said video controller at a first refresh rate, and
a power supply connected to provide power to said microprocessor, said memory, and said display;

wherein said programmable non-volatile memory of said network hub can only be programmed when codes corresponding to first and second digital signatures are received by said hub and verified against public keys stored by said hub;

wherein said first digital signature corresponds to a vendor code;

wherein said second digital signature corresponds to an authorization code;

whereby the administrator can update a system program from any computer in the system by providing said second digital signature.

14. The system of claim 13, wherein said programmable non-volatile memory is a flash memory.

15. The system of claim 13, wherein said programmable non-volatile memory comprises separately programmable first and second halves.

16. The system of claim 13, wherein an initialization program stored in said programmable non-volatile memory is executed whenever said network hub is powered on.

17. A method, comprising the steps of:
(a.) receiving, in a computer system, boot memory update data corresponding to a system program, together with a vendor digital signature and an administrator digital signature;
(b.) verifying that said first digital signature authenticates said boot memory update data, and said second digital signature authenticates said boot memory update data in combination with said first digital signature, using public keys which are nonvolatilely stored in said system; and
(c.) only if said verifying step is successful, then programming a programmable nonvolatile memory of said system with said boot memory update data;
whereby the administrator can update a system program from any computer in the system by providing said administrator digital signature.

* * * * *